US009323597B2

(12) United States Patent
Eddington

(10) Patent No.: US 9,323,597 B2
(45) Date of Patent: Apr. 26, 2016

(54) FLOW BASED FAULT TESTING

(71) Applicant: Deja vu Security, LLC, Seattle, WA (US)

(72) Inventor: Michael Eddington, Seattle, WA (US)

(73) Assignee: PEACH FUZZER LLC, Seattle, WA (US)

( * ) Notice: Subject to any disclaimer, the term of this patent is extended or adjusted under 35 U.S.C. 154(b) by 238 days.

(21) Appl. No.: 13/891,068

(22) Filed: May 9, 2013

(65) Prior Publication Data

US 2014/0047275 A1    Feb. 13, 2014

Related U.S. Application Data

(60) Provisional application No. 61/681,114, filed on Aug. 8, 2012.

(51) Int. Cl.
*G06F 11/36* (2006.01)
*G06F 11/07* (2006.01)

(52) U.S. Cl.
CPC ........ *G06F 11/0766* (2013.01); *G06F 11/3672* (2013.01)

(58) Field of Classification Search
CPC .......................... G06F 11/3668; G06F 11/3608
USPC .......................................................... 714/38.1
See application file for complete search history.

(56) References Cited

U.S. PATENT DOCUMENTS

2005/0229044 A1*  10/2005  Ball ................................ 714/38
2007/0088534 A1*   4/2007  MacArthur et al. ............ 703/17
2008/0320328 A1*  12/2008  O'Leary ......................... 714/25
2009/0228871 A1*   9/2009  Edwards et al. .............. 717/128
2010/0281460 A1*  11/2010  Tillmann et al. .............. 717/106
2011/0016356 A1*   1/2011  Artzi et al. ...................... 714/38
2011/0016456 A1*   1/2011  Artzi et al. .................... 717/131
2011/0314454 A1*  12/2011  Godefroid et al. ............ 717/131
2012/0054553 A1*   3/2012  Artzi et al. ................... 714/38.1
2012/0089868 A1*   4/2012  Meijer et al. .................... 714/26
2012/0151454 A1*   6/2012  Artzi et al. .................... 717/131

OTHER PUBLICATIONS

Wikipedia. "Concolic Testing", published online at [http://en.wikipedia.org/wiki/Concolic_testing], retrieved May 2, 2013, 5 pages.
Gotlieb, Arnaud. "Euclide: A Constraint-Based Testing framework for critical C programs", International Conference on Software Testing Verification and Validation, Apr. 2009, 10 pages.

(Continued)

*Primary Examiner* — Chae Ko
(74) *Attorney, Agent, or Firm* — Amin, Turocy & Watson, LLP

(57) ABSTRACT

Flow based fault testing is provided. A logical constraint model or a state model (LS model) can be generated based on logic/state characteristics of a system under test (SUT). The LS model can be generated from logical constraint grammar statements. The logical constraint grammar can be parsed as part of a pre-test analysis to seek faults related to the logic or states of the model. The inputs and outputs related to the SUT can be employed to determine faults, including post-test analysis for faults. The disclosed subject matter can capture in an automated or semi-automated manner faults that can be missed in more conventional fuzz testing. Further, flow based fault testing can be employed alone, along with, or in combination with conventional fuzz testing.

22 Claims, 10 Drawing Sheets

(56) References Cited

OTHER PUBLICATIONS

Sogeti Esec Lab. "Fuzzgrind", published online at [http://esec-lab.sogeti.com/pages/Fuzzgrind], retrieved May 2, 2013, 2 pages.
De Moura, Leonardo. "Constraint Satisfaction in Software Verification and Testing", NSF Workshop on Symbolic Computation for Constraint Satisfaction, 2008, 58 pages.
Godefroid, et al. "Automated Whitebox Fuzz Testing", Network Distributed Security Symposium (NDSS), Internet Society, 2008, 16 pages.
Deja Vu Security. "Peach Fuzzing Platform", published online at [http://peachfuzzer.com/Introduction.html], retrieved May 2, 2013, 2 pages.
Ceccheti, et al. "Code Repository Intrusion Detection", U.S. Appl. No. 13/692,650, filed Dec. 3, 2012, 55 pages.

* cited by examiner

FLOW BASED FAULT TESTING

CROSS REFERENCE TO RELATED APPLICATION

This application claims priority to U.S. Provisional Application Ser. No. 61/681,114, filed on 8 Aug. 2012, and entitled "DETECTION OF LOGICAL FLOW AND STATE ISSUES VIA FUZZING". The entirety of the above-referenced Application is hereby incorporated by reference into the instant application.

TECHNICAL FIELD

The disclosed subject matter relates to software testing and, more particularly, to analysis related to perturbation of information associated with software under test.

BACKGROUND

By way of brief background, software testing can be employed to determine characteristics of software under test. As an example, one common use of software testing is to determine potential security problems of the software under test. As another example, software testing can check for crashes, failing assertions, memory leaks, or other bugs.

DETAILED DESCRIPTION

Figure 1:
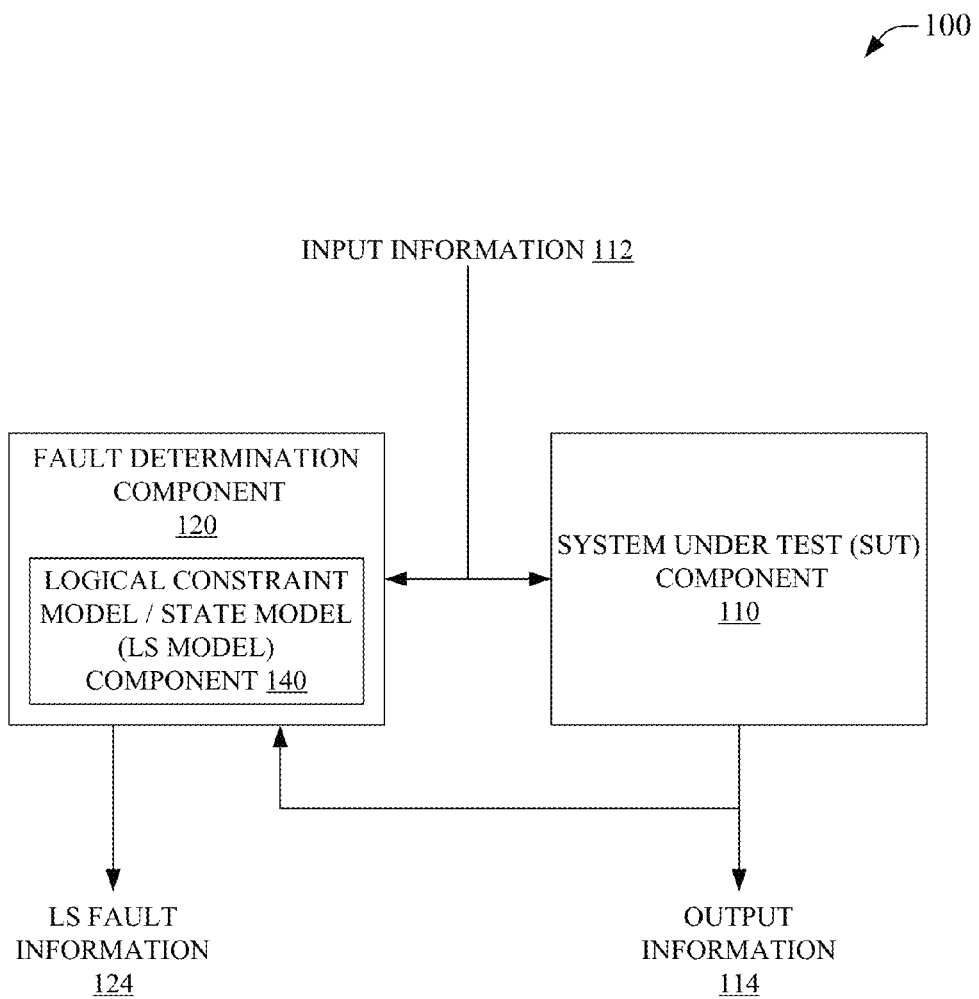
FIG. 1 is an illustration of a system that facilitates flow based fault testing in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Software testing can be employed to determine characteristics of software under test. Common uses of software testing can include determining potential security problems, checking for crashes, failing assertions, or memory leaks, or other bugs in software under test (SUT). One software testing technique can be "fuzzing" (or "fuzz testing"), which can include automated or semi-automated perturbation of inputs to SUT, e.g., providing invalid, unexpected, or random data as an input to the SUT. Fuzz testing can be performed by 'fuzzers'. Fuzzers can 'fuzz' input for a SUT. A 'fuzzer' can be a system, method, device, etc., related to fuzzing. To 'fuzz' can include perturbation of input to a SUT, including perturbation of a set of input data, e.g., a determined data set comprising perturbed inputs can be termed 'fuzzed data', a 'fuzz data file', or similar language. Conventional fuzzing typically fails to address or properly treat certain types of software failures. As an example, where a perturbed input results in advancing the SUT to a next step in a logical flow, traditional fuzzing would typically not treat this as a noteworthy event, e.g., an error in the software, even where the input should not have successfully caused the transition. It is desirable to capture failures typically overlooked by conventional fuzz testing.

As another more detailed but non-limiting example, a bug exists that allows the same username to be associated with two different passwords, despite a rule that generating a username/password pair prohibits association of a username with more than one password. In conventional fuzzing, the username with the first password and the username with the second password would both successfully login to the account associated with the username. That is, in conventional fuzzing, the login with two username/password pairs would not typically be treated as an error because the login functionality is behaving as expected, namely the login page taking a given username/password pair and either permitting or denying access to the associated account. However, allowing the login is clearly not the intention of the software developer, given the rules for associating only one password with a given username. The instant disclosure illustrates fuzz-type testing for logical flow errors and state transition errors. As an example, the dependency of the 1-to-1 relationship for username/password pairs can be modeled and tested within the scope of the present disclosure to facilitate flagging an error when a single username allows a login for two different passwords, even where those passwords are valid because of a bug in the software.

As a further detailed but non-limiting example, a virtual private network (VPN) server can be fuzzed, wherein the VPN server employs a 3-way authentication algorithm to authenticate an inbound connection, e.g., Authenticate 1→Authenticate 2→Authenticate 3→Start VPN tunnel→[ . . . ]. Where a bug exists that allows skipping the third step (Authenticate 3) to allow 'Start VPN tunnel' to work, this can present an authentication bypass because of a logic error on the VPN server. In conventional fuzzing, this would typically not result in a program crash, exception, or halt. Rather, in conventional fuzzing, the client could initiate a VPN connection without properly authenticating. Even if the logical flow is changed, conventional fuzzers typically would not be able to determine that skipping step 3 and still starting a VPN tunnel is a fault. In contrast, the presently disclosed subject matter can include a definition created to model the dependency of correctly finishing each authentication step prior to the ability to create a VPN tunnel. Therefore, skipping or performing a state transition out of order can still result in a VPN tunnel, e.g., allowing the 'start VPN tunnel', however, the 'start VPN tunnel' can be treated as a logical fault by the presently disclosed flow based fault tester.

The presently disclosed subject matter can perform several levels of analysis of code to be tested. In an aspect, pre-test analysis of logical constraints and states for code to be tested can be performed. This can include employing a model of the logical constraints and/or state transitions associated with the code to be tested. In a further aspect, post-test analysis can be performed based on the output of the code to be tested. In an additional aspect, logical constrains and/or state transitions occurring during testing of the code can be analyzed for faults. These analyses, which can be termed 'flow based fault testing', or 'flow testing' for short, can be separate from and/or in conjunction with more conventional fuzz testing. As an example, flow testing of a login page, e.g., login page code, can include testing the login page against a model of logical constraints or state transitions of the login page. This can include pre-test analysis of the model itself before testing the login page code to determine the presence of pre-test logic/state faults. Further, perturbation of the logic constraints and/or states of the login page can generate faults during testing. Additionally, the output of the login page code can be stored for post-test analyses that can determine logic/state faults. Moreover, these analyses can separate from other forms of software testing. Additionally, these analyses can also occur as an extension of conventional fuzz testing, e.g., where perturbation of input data can yield faults and moreover where perturbation of input data in combination with perturbation of the logic constraints/states of the login page can yield other information relating to faults in the login page code that could be exploited. Furthermore, it is noted that for convenience, the subject disclosure can employ the term 'logical constraint', or similar terms, to mean logical constraint and/or logical state, and can employ the term 'state', or similar terms, to mean logical constraint and/or logical state. A 'logical constraint' can include combining linear constraints by means of logical operators, such as logical-and, logical-or, negation, conditional statements (e.g., that is, if . . . then . . . ) to express complex relations between linear constraints. Logical constraints can model the expected behavior of software and testing can capture logical constraints violations in execution of the software where it departs from the model. A 'logical state' can be an abstract state of a state machine and, as such, transitions between logical states can be predicated on the current logical state and an input. State violations can therefore include transitions between logical states that do not conform to a model expressing a programmers intended state transitions, e.g., testing the software can illustrate state transitions that are undesirable or unanticipated.

The presently disclosed subject matter can employ a language to define logical constraints for SUTs. This language can be termed 'logical constraint grammar'. Logic constraint grammar can facilitate defining a state machine constraint. A fuzzing engine, such as that disclosed herein below, can be adapted to parse the logical constraint grammar and to analyze fuzzed data, define constraints for a current state being fuzzed, etc. As an example, object constraint language (OCL) can be conscripted to express state machine constraints. OCL can be regarded as a declarative language used for describing Unified Modeling Language (UML) model rules. OCL is typically understood to be part of the present UML standard, however, initially OCL was only a formal specification language extension to UML. Further, OCL is generally regarded as a precise text language that provides constraint and object query expressions of Meta-Object Facility (MOF) Object Management Group (OMG) meta-models or meta-models that cannot otherwise be expressed by diagrammatic notation. OCL can be included as a component of the OMG standard recommendation for transforming models, commonly referred to as the Queries/Views/Transformations (QVT) specification. OCL statements can execute to result in a TRUE/FALSE condition. Data and state models in a fuzzing definition and a fuzzing engine can be extended to include OCL expressions. An OCL interpreter can then be added into a fuzzer to support analysis of fuzzed data and logical constraint grammar.

The presently disclosed subject matter can also employ a detection engine to perform analysis and detection of logical constraint or state transition errors. A detection engine can employ data returned from a state machine, for example, to perform post-analysis and logic/state error detection. As another example, after a logical constraint has been violated by a SUT, state machine data can be analyzed to trigger a fault based on the logical constraint violation, even where the associated state transition did not actually crash as a result of the logical constraint violation. In the above example of authentication bypass, an analysis can check the returned data to evaluate if "Authenticated==true". In an aspect, the detection engine can inspect data flow to and/or from the SUT, even if the SUT itself is not tested. The detection engine can use defined constraints and a state machine model to determine if an invalid state transition or other logical violation occurred.

The presently disclosed subject matter can use a fuzzing engine to fuzz data and fuzz logical constraints. Fuzzing can include generation based fuzzing and mutation based fuzzing to perturb SUT input. The fuzzing engine can employ information that defines the structure, type information, relationships in the data to be fuzzed, etc., such as a model of a target SUT and the type of data that target SUT expects so as to provide meaningful fuzzing of the input for effective testing of the SUT. The fuzzing engine can additionally allow for configuration of fuzzing run parameters including selecting a data transport (e.g., a publisher), logging interface, etc. As an example, the PEACH™ fuzzing platform can be employed as a fuzzing engine.

In an aspect, a fuzzing engine can separate out modeling, e.g., modeling of the data and modeling of the state systems, from the actual fuzzing process. A fuzzing engine can also provide a robust agent/monitoring system to allow for monitoring of a fuzzing run, detecting faults (bugs), etc. Components of a fuzzing engine can be pluggable and extensible to allow for great flexibility. A fuzzing engine can operate by applying fuzzing to models of input data and SUT states. The level of detail incorporated into the models employed can distinguish between a dumb fuzzer and a smart fuzzer. A fuzzing engine can also include publishers, e.g., I/O interfaces. A publisher can take abstract concepts, e.g., input, output, call, etc., and can provide actual transport or implementation mechanisms correlated to the abstract concept. This can facilitate the ability to, for example, write to files, connect over TCP, UDP or other network protocols, make web requests, or even call COM object.

A fuzzing strategy can be expressed as logical rules describing perturbation of information by the fuzzing engine. In an aspect, a fuzzing engine can include predetermined strategies. The fuzzing engine can also include mutators that can produce perturbed data, which can include modification of existing values, creation of new data, etc. In some embodiments, mutators can be limited to single types of mutations. However, a fuzzing engine can include a plurality of mutators to enable multiple types of data perturbation. Further, a fuzzing engine can include monitors that can run inside of the fuzzing processes to perform utility tasks, such as, taking captures of network traffic during a fuzzing iteration, attaching a debugger to a process to detect crashes, re-starting a network service if it crashes or stops, etc.

Moreover, a fuzzing engine can include agents that can include special fuzzing processes, running locally or remotely, to host one or more monitors or publishers. In an aspect, agents can be the basis for a robust monitor facility to allow for monitoring simple fuzzing configurations through very complex systems that have a many tiers. A fuzzing engine can employ any number of agents or no agents at all.

Further, a fuzzing engine can include a logging facility that can save crashes and fuzzing run information. The logging facility can, in an aspect, generate output that can be accessed by other processes or components of the presently disclosed subject matter. As an example, the logging facility can log logical errors or state transition errors in a fuzz run, whereby the log can be accessed by the detection engine to perform analysis of the logical errors or state transition errors.

In an aspect, the presently disclosed subject matter can provide for pre-analysis of fuzzed data for errors of logic flow or state transitions based on the logical constraint grammar. Further, post-analysis can be performed by the detection engine by analysis of the fuzzed data sent to the SUT and the output of the SUT. Moreover, the fuzzing engine can log logic/state errors occurring in the SUT during a fuzz run. These aspects can provide for significantly more effective software testing by expanding the detection of errors from fuzzed data to include logical constraint violations and/or state transition violations in addition to the more conventional detection of crashes, memory leaks, etc.

The following presents other simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate the execution of instructions stored on the memory. The execution of the instructions can cause the processor to perform operations including receiving input information and a model related to a SUT, wherein the model can represents a logical constraint of the SUT or a state of the SUT. The processor can further determine a fault based on the model and the input information. This determined fault can be related to fault information that can then be made available for use.

In another embodiment, a method can include receiving, by a system including a processor, input information and a model associated with a system-under-test, wherein the model represents a logical constraint of the system-under-test or a state of the system-under-test. Further, the processor can facilitate access to the input information to enable testing of the system-under-test. The processor can then receive output information related to the system-under-test and determine a fault based on the model, the input information, and the output information.

In a further embodiment, a device can include a memory storing instructions and a processor that facilitates execution of the instructions. These instructions can cause the processor to perform operations including receiving input information and a model associated with a system-under-test, wherein the model represents a logical constraint of the system-under-test or a state of the system-under-test. Further operations can include facilitating access to the input information to enable testing of the system-under-test and determining a fault based on the model and the input information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates flow based fault testing in accordance with aspects of the subject disclosure. System 100 can include System under test (SUT) component 110. SUT component 110 can be software that is being tested or software code to be tested, e.g., software that is being or is to be fuzz tested or flow tested. Moreover, SUT can include both software and hardware in any combination. As an example, SUT can be login page code, an operating system on one or more types of mobile device, a control system at an electrical utility, banking software, teller machine code, code executing on a server, etc.

SUT component 110 can receive input information 112. Input information 112 can include conforming and non-conforming input for SUT component 110. As an example, where SUT component 110 is login code, input information 112 can include a username, password, string of random characters, etc. Further, input information 112 can include a set of inputs, e.g., an input test file that contains inputs for SUT component 110 that facilitate testing SUT component 110. Input information 112 can also be received by fault determination component 120.

Fault determination component 120 can facilitate determining logical constraint faults and/or state transition faults. Fault determination component 120 can analyze the behavior of SUT component 110 in response to input information 112. Further, fault determination component 120 can analyze the behavior of SUT component 110 based on a logical constraint model and/or a state model (LS model) that represent the logical constraints and/or states (LS) of SUT component 110. As an example, a LS model can indicate that in response to a valid password input, SUT component 110 can transition to a display state and in response to an invalid password input, SUT component 110 can transition to the login state again. As a second example, a LS model can indicate that a valid token for a first user must be different from a valid token of a second user, such that where the valid token of the first user and valid token of the second user are the same, entry of these two valid tokens indicates a logical constraint fault even if actual entry of valid tokens into SUT component 110 does not cause a programmatic crash of the executing code being tested. A logical constraint model and/or a state model can be accessed by way of a logical constraint model/state model component 140. Fault determination component 120 can comprise LS component 140 to facilitate access to a LS model for fault analysis of SUT component 110.

Fault determination component 120 can facilitate access to LS fault information 124. In an aspect, LS fault information 124 can be related to determined LS faults from testing of SUT component 110. As an example, where a logical constraint fault is determined based on a difference between a logical constraint model and the performance of SUT component 110 under test, this logical constraint fault can be included in LS fault information 124. LS fault information 124 can represent individual LS faults, a set of LS faults, a set of faults including a LS fault, a set of faults including a fuzz test fault and a LS fault, etc. In a further aspect LS fault information 124 can be an empty set, e.g., where there is no determined LS fault, LS fault information 124 can be null or empty. Further, LS fault information 124 can include information derived from a LS fault determination, e.g., statistical information representing the number, type, severity, etc., a line number(s) of a LS fault in executing code, or nearly any other type of information that can be related to the determination of a LS fault in a system under test.

SUT component 110 can also facilitate access to output information 114. Output information 114 can include output of executing test code or related information. As an example, output information 114 can include a value, a transition action between states, an error code, an escape character (e.g., when the executing test code crashes it can throw an escape character), timer information, checksums, parametric values, etc. Output information 114 can be received by fault determination component 120. Output information can be employed in determined LS faults in flow based fault testing. As an example, where a LS model received at LS model component 140 predicts a establishing a server connection for test code at SUT component 110 in response to receiving a valid login sequence, and input information 112 is a valid login sequence, fault determination component 120 can examine output information 114 to determine if the server connection was established by SUT component 110 executing the test code. A LS fault can be determined where the actual output included in output information 114 does not match the expected output for the given input information based on the LS model received at LS model component 140. This LS fault can be included in LS fault information 124.

In a further aspect, where a LS model is received at LS model component 140, the LS model can be analyzed to determine LS faults before executing a test of SUT component 110. This pre-testing analysis can determine the presence of LS faults based on the modeled logical constraints or state behavior of target test code. As a non-limiting example, a LS model of a set of test code can indicate that each username must get a unique password for a login test code segment of SUT component 110. Continuing the example, the LS model of the set of test code can also indicate that a password creation code segment of SUT component 110 can only generate 10,000 unique passwords before potentially repeating passwords. This exemplary logical fault can be determined before executing a testing run of the test code because it will always be true that for more than 10,000 passwords, a username can potentially be associated with a non-unique password. This fault can be determined by parsing out the logical constraints of the exemplary model. Of note, this error can also be determined in a test run of the test code where more than 10,000 passwords are created as part of the testing, because this can cause a duplicate password to be generated in the executing test code. An advantage of pre-test analysis of the LS model is that these types of LS faults can be determined based on conflicting logic without having to specifically recreate the precise conditions that cause the fault to occur as might be needed in run-time testing of SUT component 110.

In another aspect, post-test analysis can also be performed by fault determination component 120. Post-test analysis can examine output results for LS faults that otherwise appear to be normal compliant execution of the code. As an example, where a valid username is associated with two valid passwords, ether username-password combination can success- fully log into a test secure domain at SUT component 110. An executing test of SUT component 110 would be expected to continue testing where both username-password combinations are treated as valid logins. Post-test analysis can examine the successful login for the single username with two different passwords based on input information 112 including both username-password combinations and output information 114 indicating that both username-pas sword combinations were treated as valid logins. Where it is undesirable, in this example, for a username to be associated with more than one password, this past-test analysis can generate a LS fault that can be included in LS fault information 124.

A further aspect of system 100 can allow for manipulation of the logical constraints or states of STU component 110 as part of flow based fault testing. This aspect of flow based fault testing can be analogous to fuzzing input data, except that it fuzzes logical constraints and/or states. Further, this aspect can be separate from or in conjunction with more conventional data fuzzing techniques. As an example, based on an LS model for a remote procedure call (RPC) end point test. The RPC system can require an authentication call be made that provides an authentication token. This token can then be passed to each sub-sequent RPC call. A call to RPC methods without a valid token should fail. For calls such as "Authenticate→Worker1→Worker2" where a bug exists in Worker 1, a token can be provided that is not validated. This can allow the Worker 1 RPC call to be called without authenticating. The LS model can facilitate perturbation of the SUT component 110 to create allow calls to the token generated by Authenticate where calling Worker1 and Worker2 occurs. This can then analyze the results of the ability to call Worker1, e.g., calling Worker1 with an invalid token can be a fault, and can include these results in LS fault information 124. Flow based fault testing can be employed to create a framework to inject and monitor for logical faults, including, Alter State Machine Flow, Skip Integrity Checking, Authentication Bypass, Time of Check, Time of Use, Protocol State machine Short cut, Infinite Loops/DoS, etc. Of note, this is more that limited data flow or state modeling to facilitate fuzzing the packets in a protocol, because this simply detects errors in a logic path that result in a program crash. In contrast, to the limited data flow or state modeling to facilitate protocol packet fuzzing to a crash, the subject disclosure can define or detect a state machine logical constraint violation that occurs but may or may not cause a crash.

Figure 2:
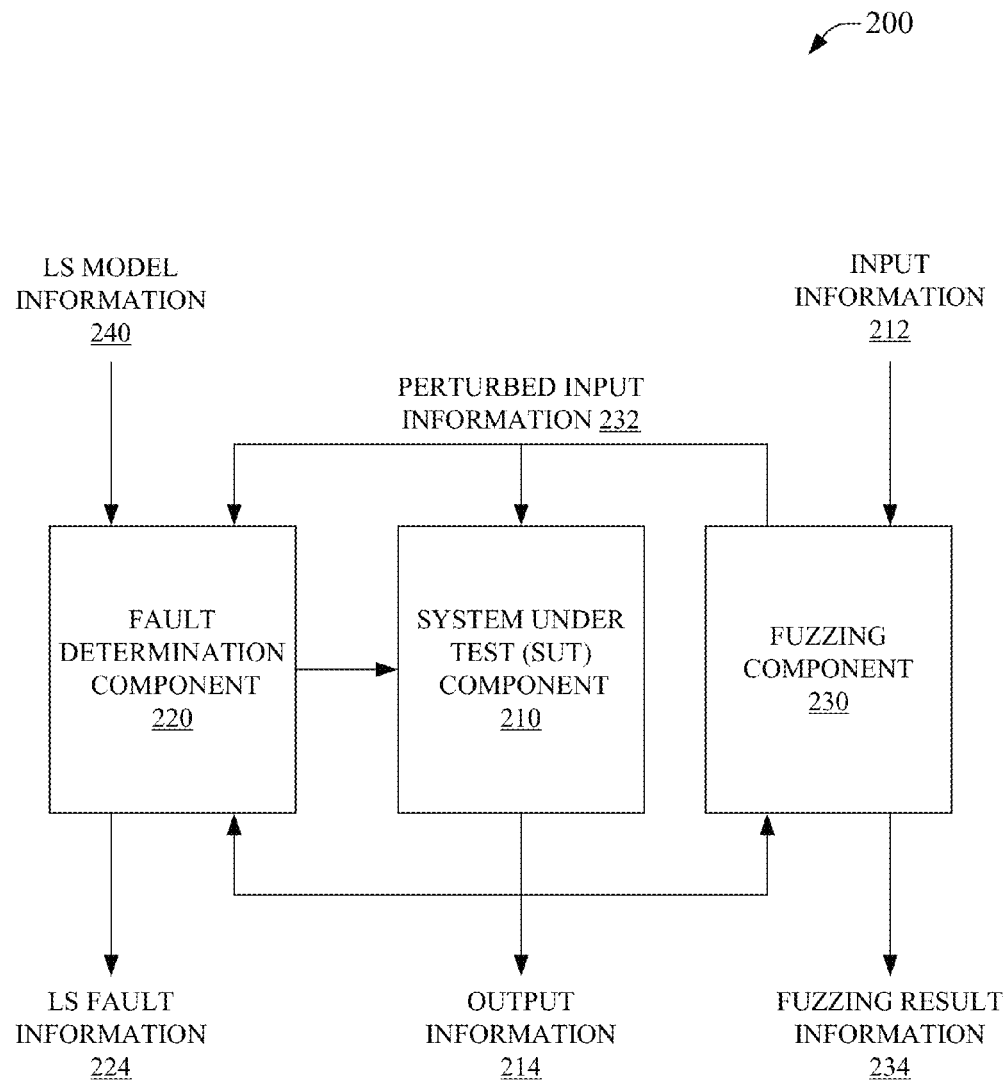
FIG. 2 is a depiction of a system that facilitates flow based fault testing in conjunction with fuzz testing in accordance with aspects of the subject disclosure.

FIG. 2 is a depiction of a system 200 that can facilitate flow based fault testing in conjunction with fuzz testing in accordance with aspects of the subject disclosure. System 200 can include SUT component 210. SUT component 210 can be software that is being tested or software code to be tested, e.g., software that is being, or is to be, fuzz tested and/or flow tested. SUT 210 can receive input information, e.g., perturbed input information 232, and facilitate access to output information 214. Output information can be the same as, or similar to, output information 114.

System 200 can further comprise fault determination component 220. Fault determination component 220 can facilitate determining logical constraint faults and/or state transition faults. Fault determination component 220 can analyze the behavior of SUT component 210 in response to input information e.g., perturbed input information 232. Further, fault determination component 220 can analyze the behavior of SUT component 210 based on a logical constraint model and/or a state model (LS model) that represent the logical constraints and/or states (LS) of SUT component 210. The LS model can be received as part of LS model information 240. Fault determination component 220 can facilitate access to LS fault information 224. LS fault information 224 can be related to determined LS faults from testing of SUT component 210. LS fault information 224 can also include information derived from a LS fault determination as disclosed elsewhere herein. Further, output information 214 can be received by fault determination component 220. Output information 214 can be employed in determined LS faults in flow based fault testing.

Fuzzing component 230 can be included in system 200. Fuzzing component 230 can facilitate perturbation of input information 212 in relation to fuzz testing SUT component 210. Fuzzing component 230 can share perturbed input information 232 that is generated in response to perturbation of input information 212. Of note, perturbed input information 232 can also include unperturbed input information to facilitate flow based fault testing and/or testing of SUT component 210 with unfuzzed data. Fuzzing component 230 can further receive output information 214. Output information 214 can be employed in analysis of errors associated with fuzzed input information 212. As an example, fuzzing a username input can cause SUT component 210 to crash. This crash event can be represented in output information 214. Fuzzing component 230 can indicate by way of fuzzing result information 234 that the fuzzed username input results in a crash of the test code at SUT component 210. Inclusion of fuzzing component 230 can facilitate more conventional fuzzing analysis in conjunction with flow based fault testing analysis of LS faults, e.g., performing both fuzzing of input data and LS fault analysis with unfuzzed input data. Further, combination testing can be performed, e.g., LS fault analysis with fuzzed input data. Moreover, in an aspect, fuzzing component 230 can be programmatically extended (not illustrated) to 'fuzz' logical constraints, e.g., perturbing logical constrains or state transitions of SUT component 210.

Figure 3:
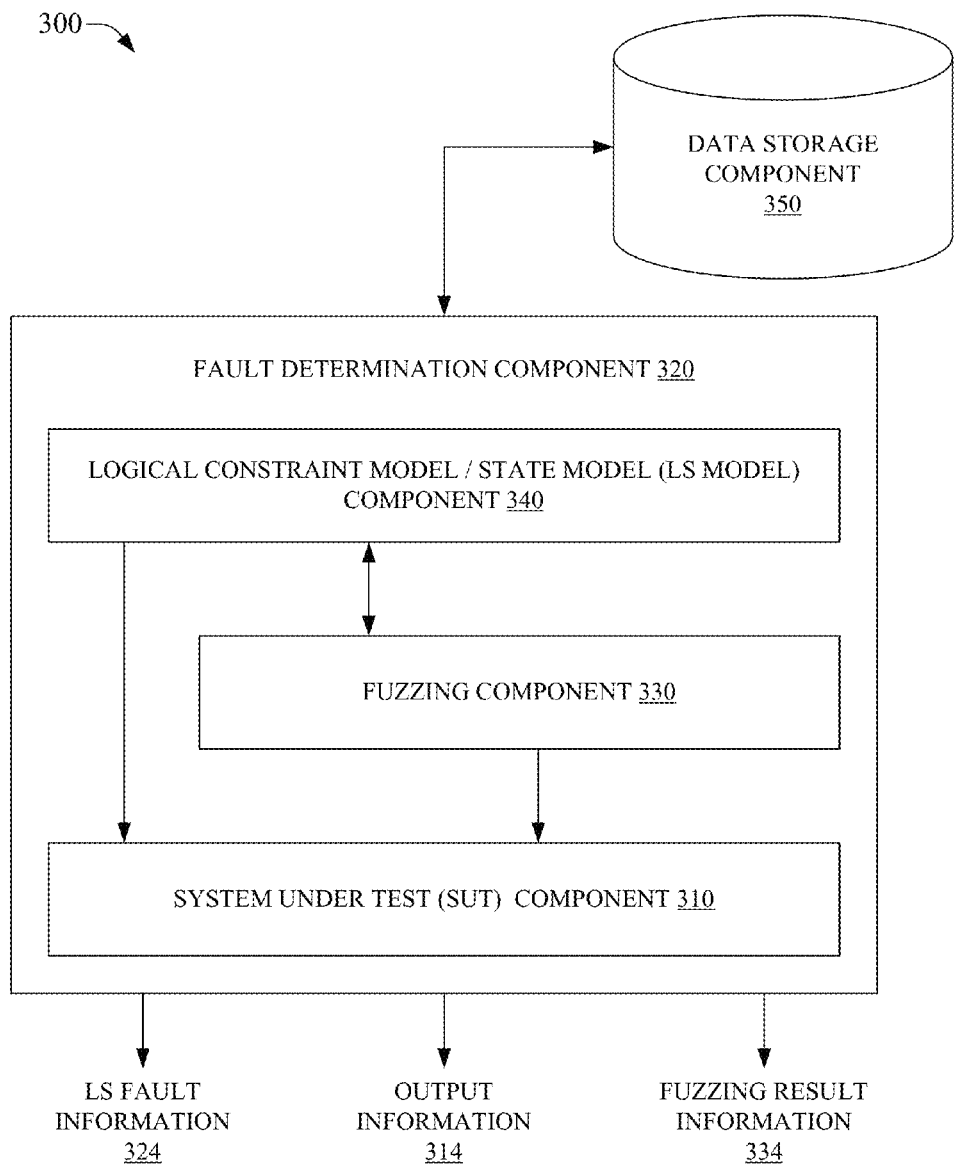
FIG. 3 illustrates a system that facilitates flow based fault testing and fuzz testing in accordance with aspects of the subject disclosure.

FIG. 3 illustrates a system 300 that facilitates flow based fault testing in conjunction with fuzz testing in accordance with aspects of the subject disclosure. System 300 can comprise fault determination component 320. Fault determination component 320 can facilitate determining logical constraint faults and/or state transition faults. Fault determination component 320 can analyze the behavior of SUT component 310 in response to input information (not illustrated). Further, fault determination component 320 can analyze the behavior of SUT component 310 based on a logical constraint model and/or a state model (LS model) that represent the logical constraints and/or states (LS) of SUT component 310.

Fault determination component 320 can further include SUT component 310. SUT component 310 can be software that is being tested or software code to be tested, e.g., software that is being, or is to be, fuzz tested and/or flow tested. SUT component 310 can receive input information (not illustrated) and facilitate access to output information 314. Output information can be the same as, or similar to, output information 114.

Data storage component 350 can also be included in system 300. Data storage component 350 can store data including input information, a LS model, etc. AS such, data storage component 350 can facilitate access to input information by fault determination component 320, such as to enable testing SUT component 310. Further, a LS model stored on data store component 350 can be accessed as LS model information provided to fault determination component 320, to enable testing by way of LS component 340.

Fault determinations component 320 can further comprise fuzzing component 330. Fuzzing component 330 can facilitate perturbation of input information, e.g., input information (not illustrated) received form data storage component 350, in relation to fuzz testing SUT component 310. Fuzzing component 330 can share perturbed input information (not illustrated) that is generated in response to perturbation of input information. Of note, perturbed input information can also include unperturbed input information to facilitate flow based fault testing and/or testing of SUT component 310 with unfuzzed data. Inclusion of fuzzing component 330 can facilitate more conventional fuzzing analysis in conjunction with flow based fault testing analysis of LS faults, e.g., performing both fuzzing of input data and LS fault analysis with unfuzzed input data. Further, combination testing can be performed, e.g., LS fault analysis with fuzzed input data. Moreover, in an aspect, fuzzing component 330 can be programmatically extended (not illustrated) to 'fuzz' logical constraints, e.g., perturbing logical constrains or state transitions of SUT component 310.

Fault determination component 320 can facilitate access to LS fault information 324, output information 314, and fuzzing result information 334. LS fault information 324 can be related to determined LS faults from testing of SUT component 310. LS fault information 324 can also include information derived from a LS fault determination as disclosed elsewhere herein. Further, output information 314 can be employed in determined LS faults in flow based fault testing. Output information 314 can also be employed in analysis of errors associated with fuzzed input information as disclosed elsewhere herein. Fuzzing result information 334 can include information related to fuzz testing SUT component 310.

Of note, data storage component 350 can be located local to fault determination component 320 or can be located distant from fault determination component 320, e.g., located remotely. As an example, data storage component 350 can be embodied in a cloud storage environment or a remote server environment such that LS models, input data sets, etc., are accessed remotely by fault determination component 320. As another example, data storage component 350 can be a hard drive on a system comprising fault determination component 320, such that data stored on data storage component 350 can be accessed by a local bus.

Figure 4:
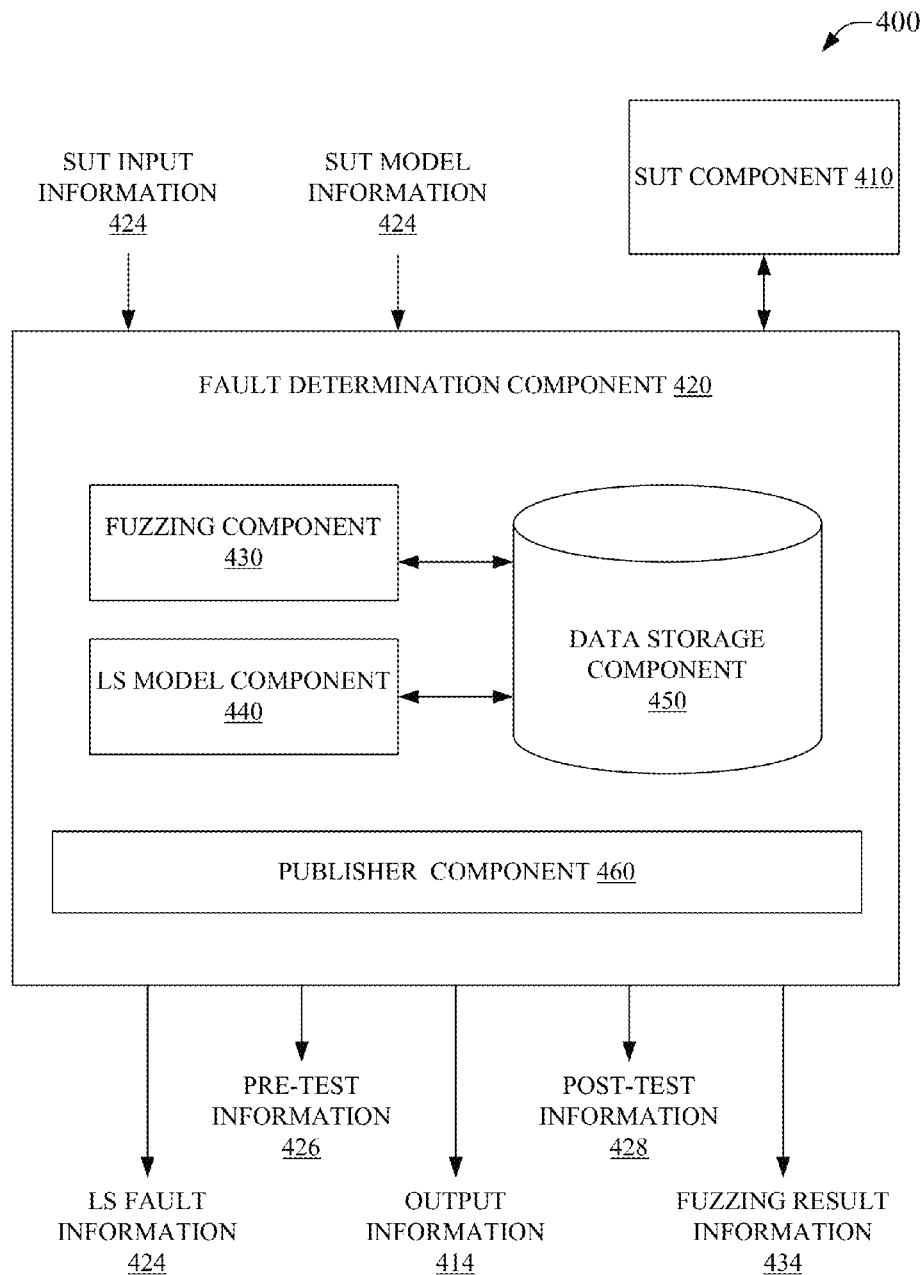
FIG. 4 illustrates a system that facilitates flow based fault testing providing pre-test and post-test information in accordance with aspects of the subject disclosure.

FIG. 4 illustrates a system 400 that facilitates flow based fault testing providing pre-test and post-test information in accordance with aspects of the subject disclosure. System 400 can include fault determination component 420. Fault determination component 420 can facilitate determining logical constraint faults and/or state transition faults. Fault determination component 420 can analyze the behavior of SUT component 410 in response to input information (not illustrated). Further, fault determination component 420 can analyze the behavior of SUT component 410 based on a logical constraint model and/or a state model (LS model) that represent the logical constraints and/or states (LS) of SUT component 410.

System 400 can further include SUT component 410. SUT component 410 can be software that is being tested or software code to be tested, e.g., software that is being, or is to be, fuzz tested and/or flow tested. SUT component 410 can receive input information (not illustrated) and facilitate access to output information 414. Output information can be the same as, or similar to, output information 114.

Fault determination component 420 can further comprise data storage component 450. Data storage component 450 can store data including input information, a LS model, etc. Data storage component 450 can therefore facilitate access to input information by fault determination component 420, such as to enable participation in testing SUT component 410. Further, a LS model stored on data store component 450 can be accessed by fault determination component 420, to enable testing by way of LS component 440.

Fault determinations component 420 can further comprise fuzzing component 430. Fuzzing component 430 can facilitate perturbation of input information, e.g., input information (not illustrated), including input information stored on data storage component 450, in relation to fuzz testing SUT component 410. Fuzzing component 430 can share perturbed input information (not illustrated) that is generated in response to perturbation of input information. Of note, perturbed input information can also include unperturbed input information to facilitate flow based fault testing and/or testing of SUT component 410 with unfuzzed data. Inclusion of fuzzing component 430 can facilitate more conventional fuzzing analysis in conjunction with flow based fault testing analysis of LS faults, e.g., performing both fuzzing of input data and LS fault analysis with unfuzzed input data. Further, combination testing can be performed, e.g., LS fault analysis with fuzzed input data. Moreover, in an aspect, fuzzing component 430 can be programmatically extended (not illustrated) to 'fuzz' logical constraints, e.g., perturbing logical constrains or state transitions of SUT component 410.

Fault determination component 420 can facilitate access to LS fault information 424, output information 414, fuzzing result information 434, pre-test information 426, and post-test information 428. Access can be enabled by publisher component 460, that can facilitate the ability to, for example, write to files, connect over TCP, UDP or other network protocols, make web requests, or even call COM object. LS fault information 424 can be related to determined LS faults from testing of SUT component 410. LS fault information 424 can also include information derived from a LS fault determination as disclosed elsewhere herein. Further, output information 414 can be employed in determined LS faults in flow based fault testing. Output information 414 can also be employed in analysis of errors associated with fuzzed input information as disclosed elsewhere herein. Fuzzing result information 434 can include information related to fuzz testing SUT component 410. Pre-test information 426 can be information related to pre-test analysis of LS faults as disclosed elsewhere herein, e.g., parsing a LS model for pre-test analysis of LS faults. Further, post-test information 428 can be information related to post-test analysis of LS faults as disclosed elsewhere herein, e.g., post-test analysis of LS faults based on an LS model, input information, and output information, especially where a crash of SUT component 410 does not occur.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
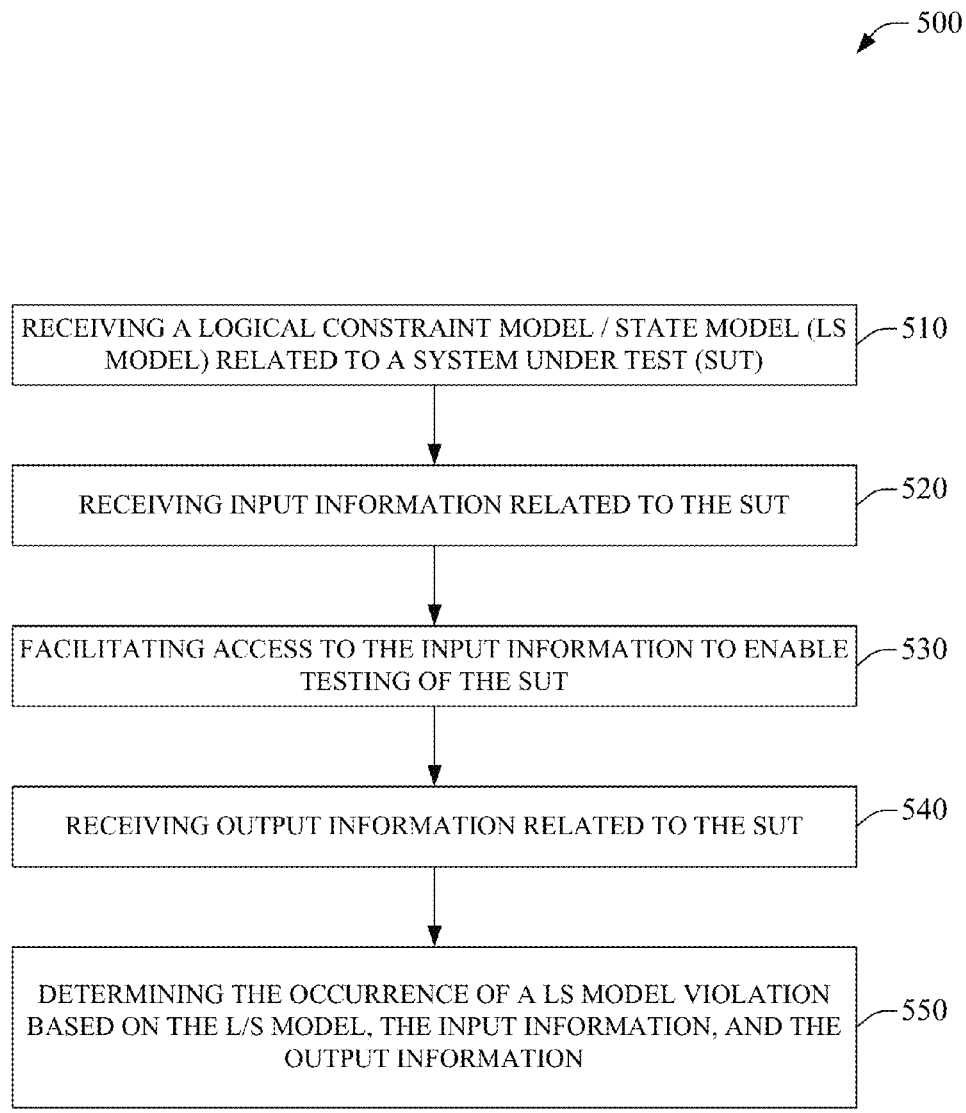
FIG. 5 illustrates a method for flow based fault testing in accordance with aspects of the subject disclosure.

FIG. 5 illustrates a method 500 for flow based fault testing in accordance with aspects of the subject disclosure. Method 500 can include receiving, at 510, a logical constraint model or state model, e.g., a LS model, related to a system under test (SUT). The LS model can represent the logical constraints or states of a system to be flow tested, e.g., a SUT. As an example, a LS model can indicate state transition from a login state to a display state in response to a valid password input. As a second example, a LS model can indicate state transition from a login state back to a login state in response to an invalid password input. As a third example, a LS model can indicate that permitting a login without first authenticating a login token is not permitted. As such, where a SUT allows a login without first authenticating the login token, a LS fault can be generated even though the SUT would not have undergone a crash.

At 520, input information can be received in method 500. The input information can be related to software to be tested or in test, e.g., the SUT. Input information can include conforming and non-conforming input for the SUT. As an example, where the SUT includes login code, input information can include a username, password, string of random characters, etc. Further, input information can include a set of inputs, e.g., an input test file that contains inputs for the SUT that facilitate testing the SUT. As an example, a testing data file can be received, wherein the testing data file includes one or more inputs that can be selected as a next input to the SUT, such as special characters or sequences of characters, inputs that do and/or do not conform with the instant SUT input parameters (e.g., too short, too long, includes/excludes characters, etc.), memory addresses (e.g., addresses in protected areas, addresses beyond available memory, etc.), and the like. Input information can be compiled into one or more test files that can be employed for testing a SUT. In an aspect, input information can be created on the fly, according to testing rules, accessed from libraries of previously determined input information, etc.

At 530, method 500 can facilitate access to the input information to enable testing of the SUT. Providing the input information received at 520 to the SUT can cause the SUT to take an action based on the input. For example, where a validation token is received at 520, the token can be input into the SUT at 530 and, in response, the SUT can transition states based on the validation token. Thus, where the validation token is bad, the SUT can transition from a first state to a second state and where the validation token is good, the SUT can transition from the first state to a third state.

At 540, method 500 can receive output information related to the SUT. Output information can related to execution of the SUT, including execution in response to receiving input information at 530. Output information can include information representing state transitions, values assigned to variables, filenames, function calls or other program calls, memory addresses, programmatic actions (e.g., reads, writes, open, close, RPC, etc.), error flags, SUT parameters, timers, crashes, etc.

At 550, the occurrence of a LS model violation can be determined. At this point, method 500 can end. Determining a LS model violation can be based on the LS model at 510, input information at 520, and output information at 540. The LS model violation can be indicated where the performance of the SUT deviates from the behavior modeled by the LS model. As an example, a test engineer can indicate in an LS model that a function call must return a token and the token must be validated before allowing access to a port. An input file can be provided that passes a NULL return for validation of the token. As such, when the SUT is being tested and calls the function, it can receive the NULL when the SUT attempts to validate the token. Where the SUT treats the NULL as a proper validation of the token, the SUT can allow access to the port. The LS model can be compared to the SUT behavior, and a LS fault can be determined to have occurred where the LS model does not allow access to the port and the SUT does allow access to the port based on the NULL input even though the NULL input does not crash either the LS model or the SUT.

In an aspect, method 500 can be employed in a detection engine. A detection engine can perform analysis and detection of logical constraint or state transition errors. A detection engine can employ data returned from a state machine, for example, to perform post-analysis and logic/state error detection. As another example, after a logical constraint has been violated by a SUT, state machine data can be analyzed to trigger a fault based on the logical constraint violation, even where the associated state transition did not actually crash as a result of the logical constraint violation. In the above example of authentication bypass, an analysis can check the returned data to evaluate if a rule included in an LS model. In an aspect, the detection engine can inspect data flow to and/or from the SUT, even if the SUT itself is not tested. The detection engine can use defined constraints and a state machine model to determine if an invalid state transition or other logical violation occurred.

As a further non-limiting example, a VPN server can be flow tested, wherein the VPN server employs a 2-way authentication algorithm to authenticate an inbound connection, e.g., Authenticate 1→Authenticate 2→Start VPN tunnel→[ . . . ]. Where the SUT includes a bug that allows skipping the second step (Authenticate 2) to allow 'Start VPN tunnel' to work, this can present an authentication bypass error. This logical error would typically not result in a program crash, exception, or halt, because the bug allows the SUT to act as if the second step (Authenticate 2) had properly executed. If the bug is not caught, the deployed code can cause a client to initiate a VPN connection without properly authenticating, representing a potential security risk. The presently disclosed subject matter can include a definition created to model the dependency of correctly finishing each authentication step prior to the ability to create a VPN tunnel, e.g., by way of an LS model. Therefore, a SUT skipping or performing a state transition out of order that can result in a VPN tunnel, e.g., allowing the 'start VPN tunnel', can be treated as a logical fault where it departs from the modeled behaviors comprising a LS model.

Figure 6:
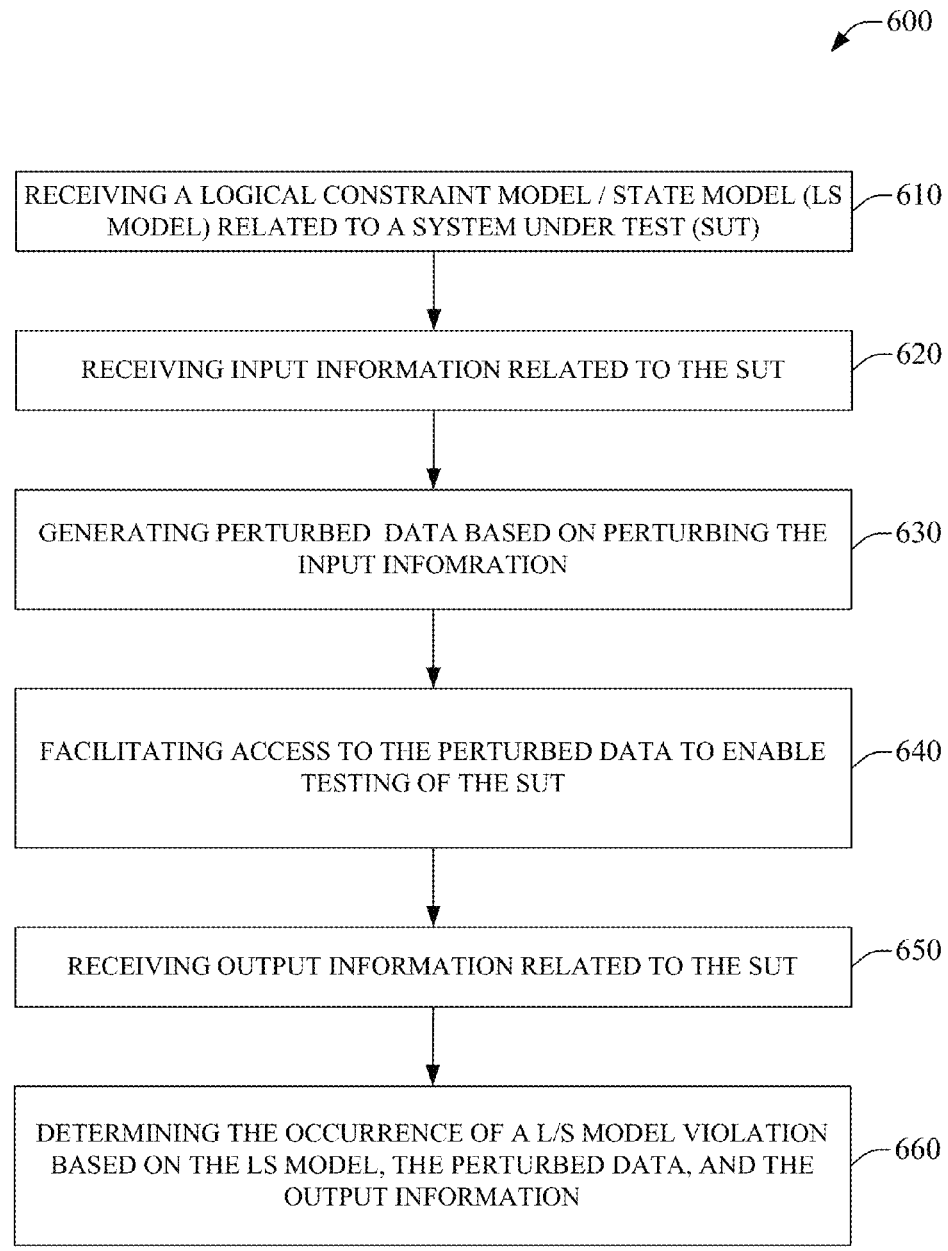
FIG. 6 illustrates a method for facilitating flow based fault testing and fuzz testing in accordance with aspects of the subject disclosure.

FIG. 6 illustrates a method 600 facilitating flow based fault testing and fuzz testing in accordance with aspects of the subject disclosure. At 610, method 600 can include receiving a LS model related to a system under test. The LS model can represent the logical constraints or states of a system to be flow tested, e.g., a SUT.

At 620, input information can be received. The input information can be related to software to be tested or in test, e.g., the SUT. Input information can include conforming and nonconforming input for the SUT. Further, input information can include a set of inputs, e.g., an input test file that contains inputs for the SUT that facilitate testing the SUT. Input information can be compiled into one or more test files that can be employed for testing a SUT. In an aspect, input information can be created on the fly, according to testing rules, accessed from libraries of previously determined input information, etc.

At 630, perturbed data can be generated. Perturbed data can be generated based on perturbation of the input data received at 620. Perturbation can include modification of logical constraints that can alter the flow of execution for a SUT. In an aspect, where the perturbed data causes the SUT execution flow to depart from the LS model flow, this can indicate a LS fault. Perturbation can further include conventional notions of input data fuzzing.

At 640, method 600 can facilitate access to the perturbed data for 630. This access can enable testing of the SUT. Where, for example, perturbed data is received at 630 is a perturbed data set, the perturbed data set can be provide to the SUT when testing is performed. As such, where the method 600 is being performed at a test center location, and the SUT is located remotely at a client server, the SUT can be given access to the perturbed data residing on the test center equipment.

At 650, output information related to the SUT can be received. Output information can related to execution of the SUT, including execution in response to receiving input information at 640. Output information can include information representing state transitions, values assigned to variables, filenames, function calls or other program calls, memory addresses, programmatic actions (e.g., reads, writes, open, close, RPC, etc.), error flags, SUT parameters, timers, crashes, etc., as disclosed elsewhere herein. Continuing the previous example, where the SUT resides on a remote server at a client, the output information can be received by method 600 at the test center. Method 600 does not require the SUT, but rather relates to making perturbed input data available to a SUT and receiving the output data of the SUT, for example, a data file can include the input-output information from a SUT test executed days, weeks, or months before and, given the LS model of the SUT, can perform analysis to check for LS faults, indicating that the SUT need not be part of performing method 600. Method 600 also can perform with access to the SUT at the time of flow testing.

At 660, the occurrence of a LS model violation can be determined. At this point, method 600 can end. Determining a LS model violation can be based on the LS model at 610, perturbed data at 620, and output information at 650. The LS model violation can be indicated where the performance of the SUT deviates from the behavior modeled by the LS model.

In an aspect, where perturbation of the input information at 630 includes conventional fuzzing of input data, method 600 can further detect conventional fuzz test errors. Furthermore, conventional fuzz testing can be performed in conjunction with flow based fault detection or in combination with flow based fault detection. As such, flow based fault detection can be performed with unperturbed input data, can be performed with perturbed input data, or can be performed with both. Moreover, perturbation of the input information can be limited to logical constraint or state perturbations, limited to more conventional fuzz test type perturbations, or include both.

Figure 7:
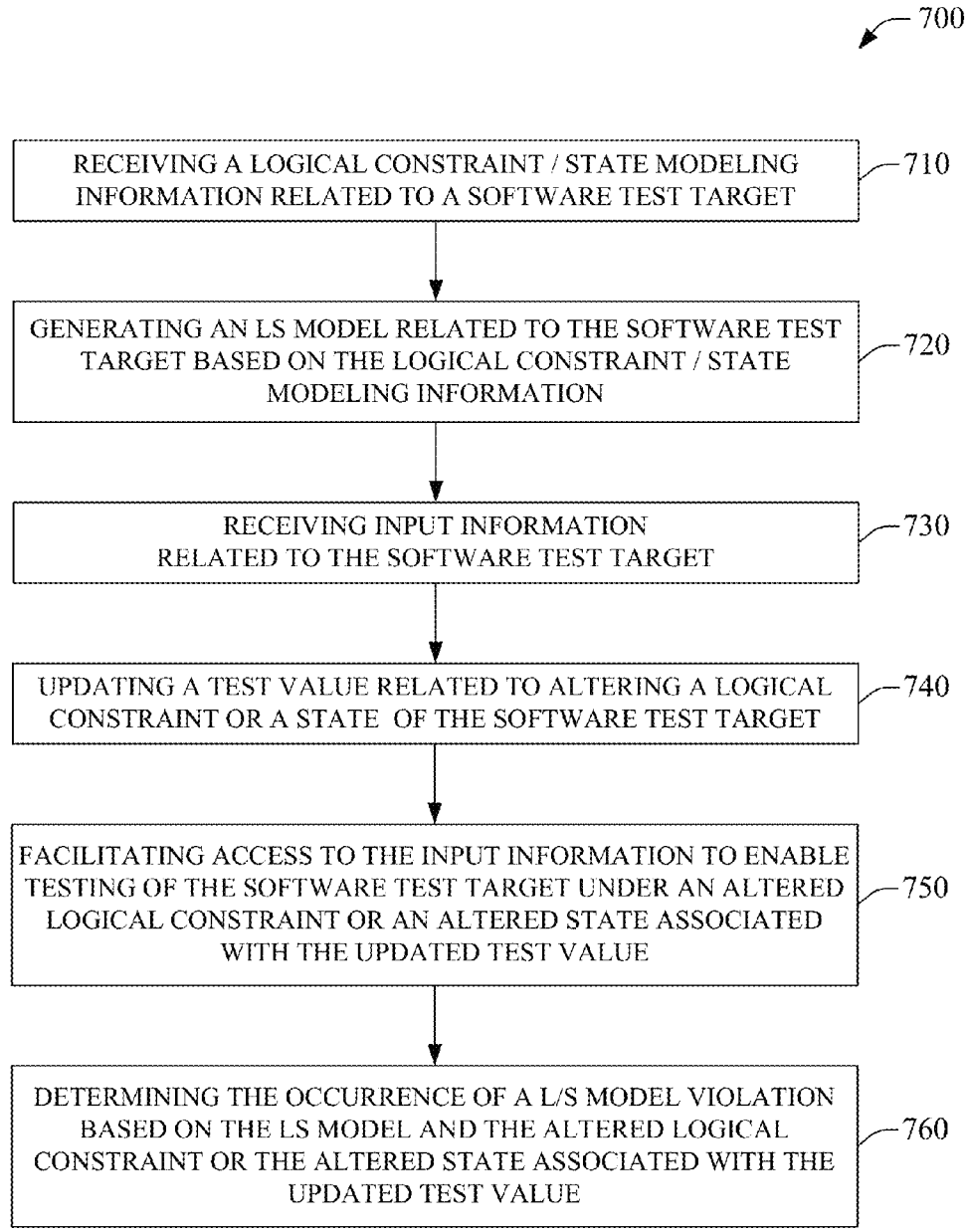
FIG. 7 illustrates a method for facilitating flow based fault testing with perturbed states in accordance with aspects of the subject disclosure.

FIG. 7 illustrates aspects of method 700 facilitating flow based fault testing with perturbed states in accordance with aspects of the subject disclosure. At 710, logical constraint and/or state modeling information can be received. This information can be related to target test software. Modeling information can be language, e.g., logical constraint grammar, which enables development of a LS model. As an example, object constraint language (OCL) can be employed to express state machine constraints. This can facilitate development of a LS model representative of the flow of a software test target. As such, at 720, a LS model can be generated. The LS model can be related to the software test target, and be based, at least in part, on the logical constraint and/or state modeling information received at 710. In an aspect, the logical constraint and/or state modeling information received at 710 can be employed to create a new LS model at 720. In a further aspect, the logical constraint and/or state modeling information received at 710 can be employed to update or modify a LS model to better reflect the flow of the software test target.

At 730, input information can be received. The input information can be related to the software test target, e.g., the software code to be tested or in test. Input information can include conforming and non-conforming input for the software test target. Further, input information can include a set of inputs, e.g., a input test file that contains inputs for the software test target that facilitate testing the software test target. Input information can be compiled into one or more test files that can be employed for testing a software test target. In an aspect, input information can be created on the fly, according to testing rules, accessed from libraries of previously determined input information, etc.

At 740, method 700 can update a test value employed by the software test target. The test value can be related to the programmatic flow of the software test target. As such, updating the test value can be associated with altering a logical constraint or a state of the software test target. As an example, a test value can be updated that causes the software test target, when executing, to begin in a different state, such as beginning in an administrator mode rather than a user mode, etc. As a further example, the test value can cause the software test target to accept a different logical constraint, such as treating a failed return from a function call as a valid response from the function call, etc. In an aspect, updating the test value at 740 can allow directed interaction with the software test target to steer flow testing. This can allow directed flow based fault testing of the software test target for test conditions of particular interest to a tester.

At 750, access to the input information of 730 can be facilitated. This access can enable testing of the software test target. Where, for example, input information received at 730 is an information set, the set can be provide to the software test target when testing is performed.

At 760, a LS model violation can be determined. At this point, method 700 can end. Determining a LS model violation can be based on the LS model at 720 and the altered logical constraint or state of the software test target at 740, where the altered logical constraint or state of the software test target is associated with the update of the test value at 740. The LS model violation can be indicated where the performance of the software test target deviates from the behavior modeled by the LS model.

Figure 8:
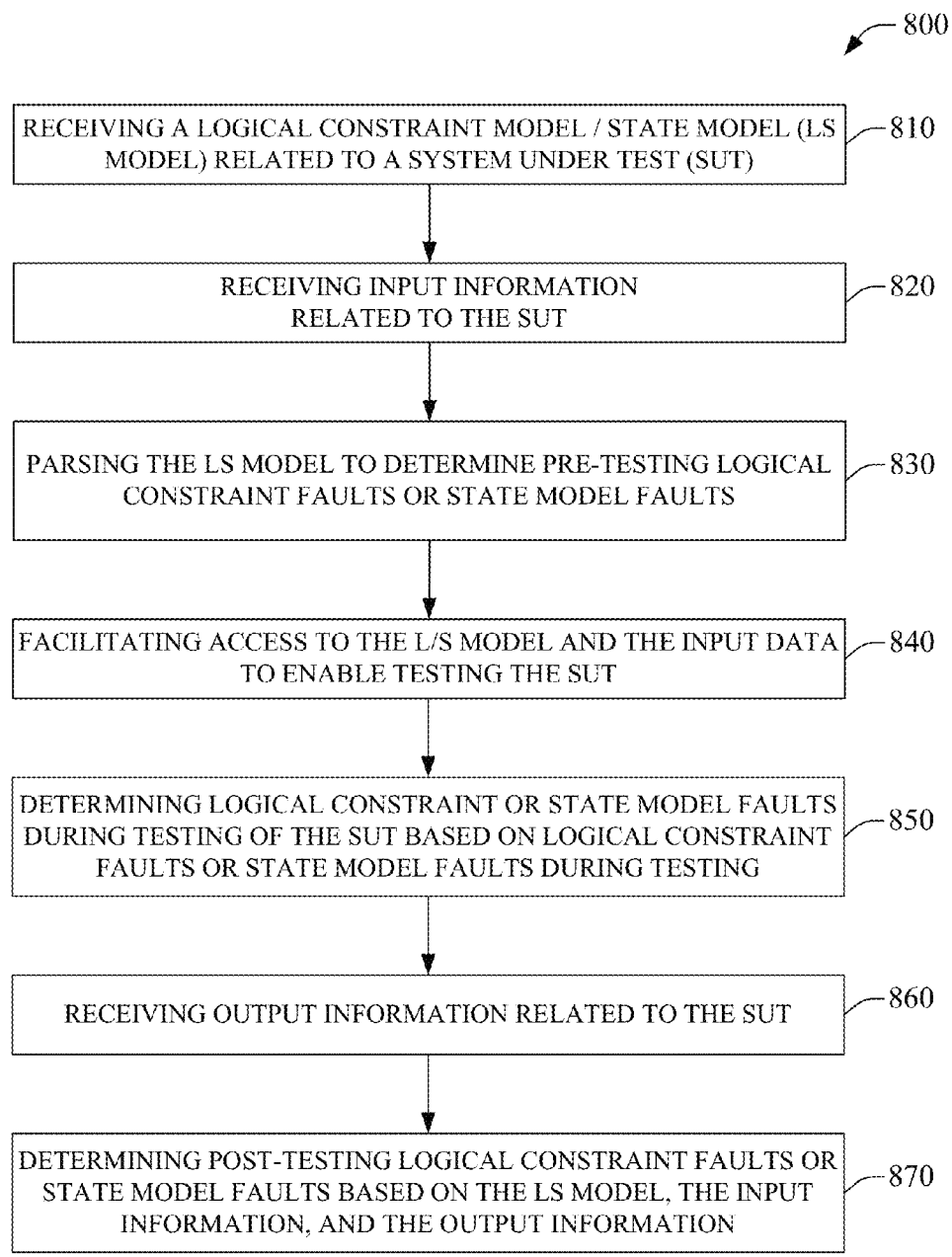
FIG. 8 illustrates a method for facilitating flow based fault testing with pre-test and post-test information in accordance with aspects of the subject disclosure.

FIG. 8 illustrates aspects of method 800 facilitating flow based fault testing with pre-test and post-test information in accordance with aspects of the subject disclosure. At 810, method 800 can include receiving a LS model related to a system under test. The LS model can represent the logical constraints or states of a system to be flow tested, e.g., a SUT. At 620, input information can be received. The input information can be related to software to be tested or in test, e.g., the SUT. Input information can include conforming and non-conforming input for the SUT. Further, input information can include a set of inputs, e.g., an input test file that contains inputs for the SUT that facilitate testing the SUT. Input information can be compiled into one or more test files that can be employed for testing a SUT. In an aspect, input information can be created on the fly, according to testing rules, accessed from libraries of previously determined input information, etc.

At 830, the LS model can be parsed to determine pre-testing LS faults. In an aspect, where the LS model is comprised of logical constraint language elements, the logical constraint language can be parsed. Parsing the LS model can facilitate inspection of logical suppositions that can be associated with LS faults without a need to execute a flow test run on a SUT, e.g., pre-testing analysis. As a non-limiting example, a LS model can indicate that each username must get a unique password. The LS model of the set of test code can also indicate that a password creation code segment of a SUT can only generate 10,000 unique passwords before potentially repeating passwords. As such, a logical fault, e.g., LS fault, can be determined before executing a testing run of the SUT because it will always be true that for more than 10,000 passwords, a username can potentially be associated with a non-unique password. This fault can be determined by parsing out the logical constraints of the exemplary model. Of note, this error can also be determined in a test run of the SUT where more than 10,000 passwords are created as part of the testing, because this actually performs the flawed logical processes and can cause a duplicate password to be generated in the executing test code. An advantage of pre-test analysis of the LS model is that these types of LS faults can be determined based on conflicting logic without having to specifically recreate the precise conditions that cause the fault to occur as might be needed in run-time testing of a SUT.

At 840, access to the LS model and the input data can be facilitated. This can enable execution of the SUT as part of flow based fault testing. At 850, LS faults can be determined during execution of a SUT. In an aspect, these LS faults can be determined based on the LS model deviating from the execution of the SUT. As an example, where Worker 2 must be validated before Worker 3, but a bug in the SUT allows Worker 3 to be validated before Worker 2 without crashing the SUT, this can be logged as a LS fault during execution of the SUT as part of flow based fault detection.

At 860, output information related to the SUT can be received. In an aspect, this output information can be related to the execution of the SUT as part of the flow based fault testing associated with 840. At 870, post-test analysis can be performed. At this point, method 800 can end. Post-testing for LS faults can be based on the LS model, the input information from 820, and the output information from 860. Post-test analysis can examine output results for LS faults that otherwise appear to be normal compliant execution of the code. As an example, where a valid username is associated with two valid passwords, ether username-password combination can successfully log into a test secure domain element of the SUT. Post-test analysis can examine the successful login for the single username with two different passwords based on input information including both username-pas sword combinations and output information indicating that both username-pas sword combinations were treated as valid logins. Where it is undesirable based on an LS model for a username to be associated with more than one password, this post-test analysis can generate a LS fault that can be included in LS fault information.

Figure 9:
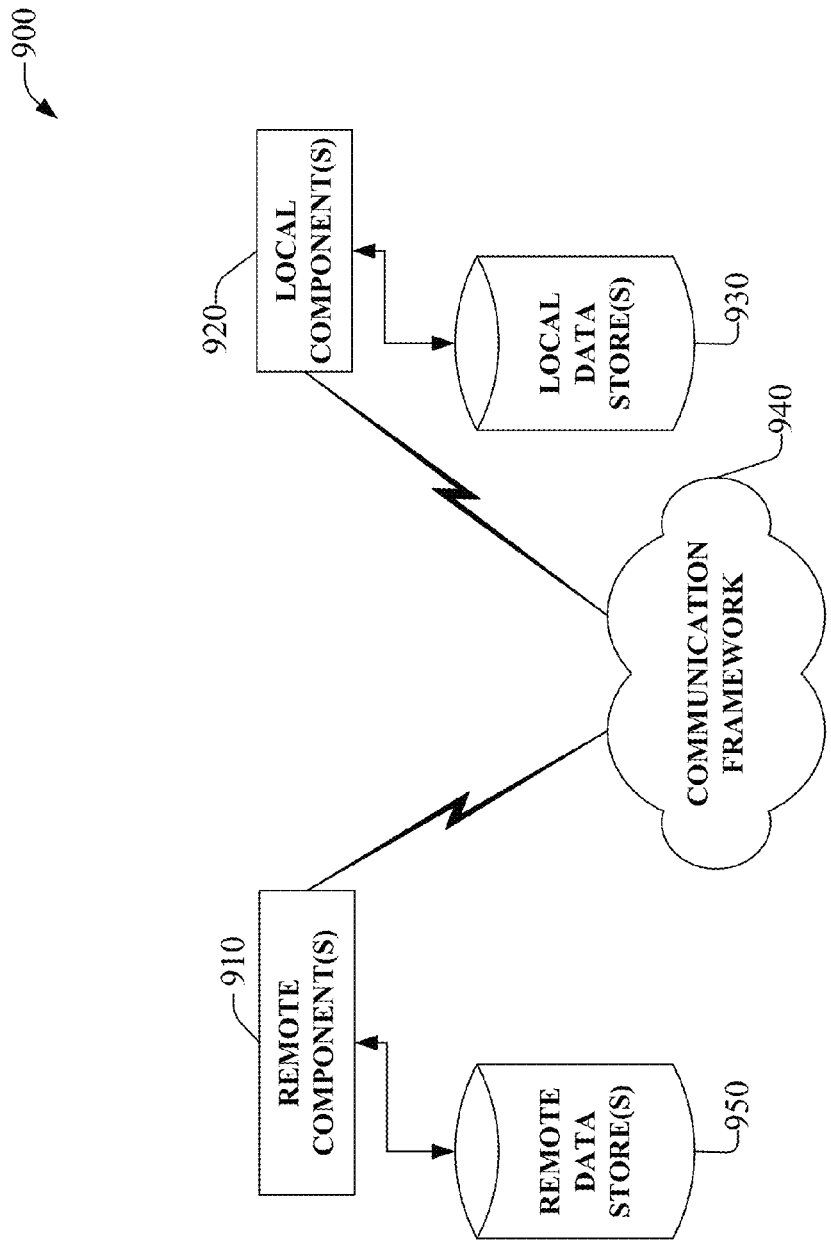
FIG. 9 depicts a schematic block diagram of a sample-computing environment with which the claimed subject matter can interact.

FIG. 9 is a schematic block diagram of a sample-computing environment 900 with which the claimed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include fault determination component 120, 220, etc. As an example, remote component(s) 910 can be a test center computer (remote from a target SUT) that has a flow based fault test interface to execute a SUT remotely on a client server. In some embodiments, the SUT, e.g., SUT component 110, etc., can be treated as the remote component 910 where the local component 920 can include fault determination component 120, etc.

The system 900 also includes one or more local component(s) 920, which can include server-side component(s). The local component(s) 920 can be hardware and/or software (e.g., threads, processes, computing devices). In some embodiments, local component(s) 920 can include SUT component 110, 210, etc. As an example, local component(s) 920 can be a client server housing a code repository that can include a SUT that can be executed on the client side and distant from remote component(s) 910, e.g., a test center, by way of an interface. In some embodiments, fault determination component 120, etc., can be treated as the remote component 910 where the local component 920 can correspondingly include SUT component 110, etc.

One possible communication between a remote component(s) 910 and a local component(s) 920 can be in the form of a data packet adapted to be transmitted between two or more computer processes. As an example, a code set can be communicated between a code developer's computing system, e.g., remote component 910, and a testing server, e.g., a local component 920. As a further example, a code set, e.g., a SUT, can be executed remotely and execution information can be communicated between a SUT computing system, e.g., remote component 910, and a flow based fault determination computer, e.g., a local component 920. As such, the SUT can be stored remote from test components and can interact with the test components either remotely, e.g., remote test execution, or where the SUT is copied to the local test components from the remote location, the SUT can be locally executed. The system 900 includes a communication framework 940 that can be employed to facilitate communications between the remote component(s) 910 and the local component(s) 920. The remote component(s) 910 are operably connected to one or more remote data store(s) 950 that can be employed to store information on the remote component(s) 910 side of communication framework 940. Similarly, the local component(s) 920 are operably connected to one or more local data store(s) 930 that can be employed to store information on the to the local component(s) 920 side of communication framework 940.

Figure 10:
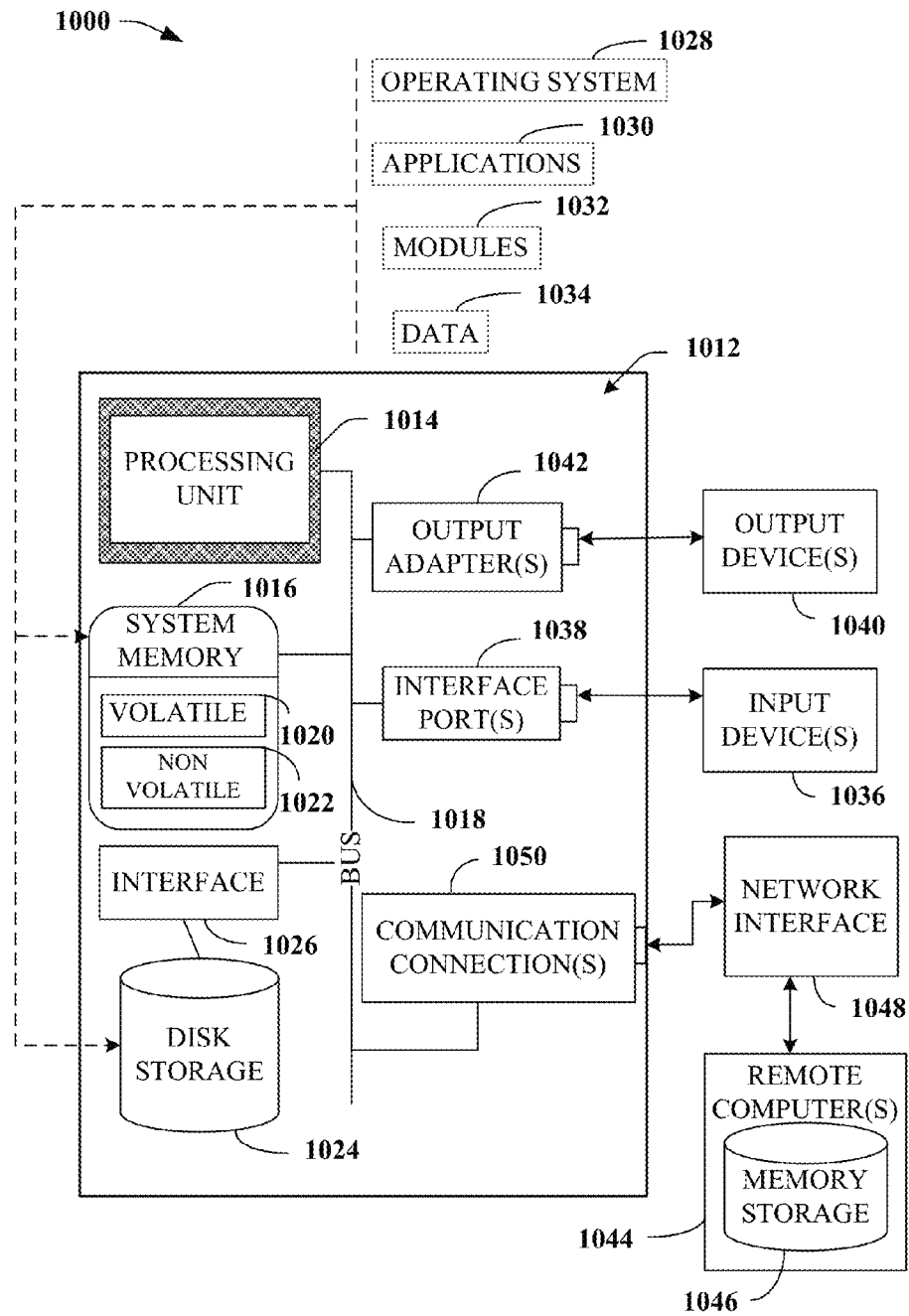
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be employed, for example, by a test engineer to develop a LS model, perform flow based fault testing, etc., includes a processing unit 1014, a system memory 1016, and a system bus 1018. Computer 1012 can also comprise, for example, fault determination component 120, 220, etc., SUT component 110, 210, etc., or fuzzing component 230, 330, etc. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a software developer can submit source code for a SUT, a test engineer can input logical constraint language or a LS model, etc., by way of a user interface, such as an interface embodied in a touch sensitive display panel allowing a developer or engineer to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
  a memory to store instructions; and
  a processor, coupled to the memory, that facilitates execution of the instructions to perform operations, comprising:
    receiving input information related to a system-under-test;

receiving a logical constraint model associated with the system-under-test, wherein the logical constraint model represents a logical constraint of the system-under-test or a state of the system-under-test;

determining, in response to the system-under-test receiving the input information, a fault in the system-under-test based on a behavior of the system-under-test being determined to differ from an expected behavior of the system-under test based on the logical constraint model and the input information; and facilitating access to fault information related to the fault.

2. The system of claim 1, the operations further comprising:

receiving output information correlated to the input information and related to the system-under-test, wherein the determining the fault is further based on the output information.

3. The system of claim 2, wherein the output information includes information relating to the logical constraint determined from execution of the system-under-test or the state transition determined from execution of the system-under-test.

4. The system of claim 2, wherein the fault is related to a difference between the logical constraint model and execution of the system-under-test, and the difference is associated with the logical constraint of the system-under-test or the state of the system-under-test.

5. The system of claim 1, the operations further comprising:

generating perturbed input information based on perturbing the input information, wherein the determining the fault is based on the model and the perturbed input information.

6. The system of claim 5, wherein the perturbing the input information includes perturbing the input information to expose the fault as being related to a difference between the logical constraint model and execution of the system-under-test, and further as being related to the logical constraint of the system-under-test or the state of the system-under-test.

7. The system of claim 5, wherein the perturbing the input information includes perturbing the input information to expose the fault as being related to a difference between the logical constraint model and execution of the system-under-test without causing a function of the system-under-test to cease to function.

8. The system of claim 5, wherein the perturbing the input information includes perturbing the input information to expose the fault as being related to causing a function of the system-under-test to cease functioning.

9. The system of claim 1, wherein the receiving input information comprises receiving the input information from a remote data store remotely located from the system.

10. The system of claim 1, wherein the determining the fault comprises:

parsing language associated with formation of the logical constraint model into logical statements, including a first logical statement and a second logical statement; and analyzing the logical statements to determine the fault as being related to the logical constraint of the system-under-test or the state of the system-under-test before executing a test of the system-under-test, wherein the determining the fault is based on a conflict between the first logical statement and the second logical statement.

11. A method, comprising:

receiving, by a system including a processor, a logical flow model associated with a system-under-test, wherein the logical flow model represents a logical constraint of the system-under-test or a state of the system-under-test;

receiving input information related to the system-under-test;

facilitating access to the input information to enable testing of the system-under-test;

receiving output information related to the system-under-test; and determining, in response to the system-under-test receiving the input information, a fault in the system-under-test based on a behavior of the system-under-test differing from an expected behavior of the system-under test based on the logical flow model, the input information, and the output information.

12. The method of claim 11, wherein the receiving the logical flow model further comprises:

receiving flow model development information related to the system-under-test; and generating the logical flow model based on the flow model development information.

13. The method of claim 12, wherein the generating the logical flow model comprises generating a flow model.

14. The method of claim 12, wherein the generating the logical flow model comprises updating a stored flow model.

15. The method of claim 11, further comprising:

generating perturbed input information based on perturbation of the input information, wherein the facilitating access to the input information includes facilitating access to the perturbed input information, and the determining the fault is based on the logical flow model, the perturbed input information, and the output information.

16. The method of claim 11, further comprising:

parsing language associated with formation of the logical flow model into logical statements, including a first logical statement and a second logical statement; and analyzing the logical statements to determine the fault is related to the logical constraint of the system-under-test or the state of the system-under-test before initiating a test of the system-under-test, wherein the determining the fault is based on a conflict between the first logical statement and the second logical statement.

17. A computer-readable storage medium, comprising computer-executable instructions that, in response to execution, cause a device including a processor to perform operations, comprising:

receiving a fuzzable logic model associated with a system-under-test, wherein the fuzzable logic model represents a logical constraint of the system-under-test or a state of the system-under-test;

receiving input information related to the system-under-test;

facilitating access to the input information to enable testing of the system-under-test; and determining, in response to the system-under-test receiving the input information, a fault in the system-under-test based on a behavior of the system-under-test being determined to be different from an expected behavior of the system-under test based on the fuzzable logic model and the input information.

18. The computer-readable storage medium of claim 17, the operations further comprising:

receiving output information related to the system-under-test, and wherein the determining the fault is further based on the output information.

19. The computer-readable storage medium of claim 17, wherein the fault is related to a difference between the fuzzable logic model and execution of the system-under-test, and the difference is associated with the logical constraint of the system-under-test or the state of the system-under-test.

20. The computer-readable storage medium of claim 17, the operations further comprising:

generating perturbed input information based on perturbation of the input information, wherein the facilitating access to the input information includes facilitating access to the perturbed input information, and the determining the fault is based on the fuzzable logic model, the perturbed input information, and the output information.

21. The computer-readable storage medium of claim 17, the operations further comprising:

receiving model development information related to the system-under-test; and generating the fuzzable logic model based on the model development information.

22. The computer-readable storage medium of claim 21, the operations further comprising:

parsing into logical statements, language associated with the generating the fuzzable logic model, the logical statements including a first logical statement and a second logical statement; and analyzing the logical statements to determine the fault is related to the logical constraint of the system-under-test or the state of the system-under-test before commencing a test of the system-under-test, wherein the determining the fault is based on a conflict between the first logical statement and the second logical statement.

* * * * *